United States Patent [19]

Malatesta et al.

[11] Patent Number: 5,242,624
[45] Date of Patent: Sep. 7, 1993

[54] STABILIZING MIXTURE FOR COMPOUNDS HAVING A PHOTOCHROMATIC ACTIVITY

[75] Inventors: Vincenzo Malatesta, Cologno Monzese; Pietro Allegrini, San Donato Milanese; Luciana Crisci, Sant'Angelo Lodigiano, all of Italy

[73] Assignee: Enichem Synthesis S.p.A., Palermo, Italy

[21] Appl. No.: 760,134

[22] Filed: Sep. 16, 1991

[30] Foreign Application Priority Data

Sep. 18, 1990 [IT] Italy .................. 21502 A/90

[51] Int. Cl.$^5$ .................. G02B 5/23; F21V 9/04
[52] U.S. Cl. .................. 252/586; 252/589
[58] Field of Search .................. 252/582, 586, 589

[56] References Cited

U.S. PATENT DOCUMENTS

| | | | |
|---|---|---|---|
| 3,844,792 | 10/1974 | Zweig et al. | 252/586 |
| 4,720,356 | 1/1988 | Chu | 252/586 |
| 4,931,221 | 6/1990 | Heller | 252/586 |
| 4,946,880 | 8/1990 | Costanzi et al. | 524/96 |
| 4,975,474 | 12/1990 | Barsotti et al. | 523/400 |

Primary Examiner—Robert L. Stoll
Assistant Examiner—Philip Tucker
Attorney, Agent, or Firm—Oblon, Spivak, McClelland, Maier & Neustadt

[57] ABSTRACT

Stabilizing mixture for photochromatic substances containing a cyclic amine chosen from 1,4-diazabicyclo-(2.2.2)octane and quinuclidine, or their derivatives, and at least one sterically hindered amine.

11 Claims, No Drawings

STABILIZING MIXTURE FOR COMPOUNDS HAVING A PHOTOCHROMATIC ACTIVITY

DESCRIPTION

The present invention concerns a stabilizing mixture for compounds having a photochromatic activity, and said mixture guarantees an exceptionally long-lasting activity of the relative photochromatic composition; the invention also concerns this photochromatic composition as well as the articles which become photochromatic on the addition of this composition.

Photochromatic compounds are substances which have the characteristic of reversibly changing colour and/or degree of light transmission when exposed to certain types of electromagnetic radiation and solar light, returning to their initial state of colour and light transmission as soon as the source of light is removed.

There are many known substances which have photochromatic characteristics and which belong to different classes of both organic and inorganic compounds, as described for example in "Photochromism", G. H. Brown (Ed.), Vol. 32 of the Weissberger series "Techniques of Organic Chemistry", Wiley Interscience, N.Y. (1971).

Among the better known organic photochromatic compounds are those belonging to the group of spiro-indoline-oxazines and spiro-indoline-pyranes, which are able to give photochromatic characteristics to polymer systems for paints, inks, adhesives, as well as to polymerized organic materials used for sun filters, optical instruments, optical memories, printing, photography, fabrics, decorating articles, toys, as described for example in U.S. Pat. Nos. 3,562,172, 3,578,602, 4,215,010, 4,342,668 and in European patent applications 134.633 and 141.407.

According to the known art, a photochromatic compound can be deposited on an article by means of impregnation or thermal transfer, as specified in U.S. Pat. No. 4,286,957.

There is also the possibility of applying the photochromatic compound immersed in a paint spread over the surface of the article which is to become photochromatic. These methods of surface application, at times, allow articles to conserve their photochromatic characteristics only for limited periods of time.

The introduction of a photochromatic compound into the mass of an article, especially when this is made of thermoplastic material, can, on the other hand, create problems to which no satisfactory solution has yet been found. Thermoplastic materials are transformed into finished articles by the usual techniques of moulding, extrusion and the like. In the conditions, especially of temperature, under which these processes are carried out, the organic photochromatic compounds are likely to undergo degradation or at least degeneration, accompanied by the irreversible development of undesirable colouring.

In addition, it is also known that organic photochromatic compounds incorporated in polymer matrices or in solutions, undergo rapid degradation, losing their photochromatic activity due to exposure to light under normal conditions of use.

A solution to these problems has been offered by the Applicant through a procedure which, as described in Italian patent applications No. 21098 A/88 and No. 19407 A/87, consists of mixing, either before or during the processing phase of the thermoplastic organic polymers, an organic photochromatic compound with, respectively, a basic organic compound containing nitrogen, chosen from non-cyclic or cyclic non-aromatic amines, amidines and guanidines, or sterically hindered amines containing silicon in their molecular structure.

Photochromatic compositions are also known (U.S. Pat. No. 4,720,356), which are fatigue resistant under light and which include a spirooxazine combined with a sterically hindered amine, chosen from those normally used for the stabilization of organic polymers to ultraviolet light.

The stabilization of photochromatic activity given by the above-mentioned substances is not guaranteed, however, for more than a limited, and sometimes not sufficient, period of time, after which this activity decreases, even dramatically, making the preparation of photochromatic compositions and relative articles and manufactures, unreasonably expensive.

The Applicant has now discovered, and this is the aim of the present invention, that it is possible to prolong the photochromatic activity of photochromatic substances of interest, beyond any presumably known limit of the stabilizing effect of the above-mentioned compounds, by adding to one or more of the photochromatic substances, a stabilizing mixture comprising an amine chosen from 1,4-diazabicyclo-(2.2.2) octane (hereafter called DABCO) and quinuclidine or their derivatives, and at least one sterically hindered amine (hereafter called HALS): this mixture stabilizes the photochromatic characteristics of the substance to which it has been added for a much longer period than the presumable contribution of any single additive, in such a way that the loss of photochromatic activity occurs after a period which is at least several times greater compared to that of a product which does not contain one of the above cyclic amines.

A first object of the present invention consequently concerns a mixture which stabilizes the photochromatic activity of compounds possessing this activity, including an amine chosen from 1,4-diazabicyclo-(2.2.2) octane (DABCO) and quinuclidine or their derivatives and at least one sterically hindered amine.

A second object of the present invention concerns a fatigue resistant under light photochromatic composition, with a prolonged activity, comprising at least one photochromatic compound mixed with 1,4-diazabicyclo-(2.2.2) octane or quinuclidine, or their derivatives, and with at least one sterically hindered amine.

In the above composition the weight ratio between the mixture of stabilizers and the photochromatic compound ranges between 0.5 and 50, preferably from 2 to 25, whereas in the above mixture of stabilizers, the weight ratio between the cyclic amine and the sterically hindered amine ranges between 20 and 0.5, preferably between 10 and 1.

An additional subject of the present invention concerns a photochromatic article, characterized by the fact that it contains at least:
 a) an organic polymer;
 b) a photochromatic compound;
 c) a mixture of stabilizers containing DABCO or quinuclidine or their derivatives and at least one sterically hindered amine, in which component b) is present from 0.01 to 3 parts by weight for every 100 parts by weight of component a) and component c) is present in the above specificied weight ratio with respect to b).

Polymers useful for this purpose are polyolefins such as polyethylene (low and high density and linear low density), and polypropylene, polyvinylchloride, plasticized polyvinylchloride, ethylene-vinylacetate (EVA), polyvinylacetate, polyvinyl butyral, cellulose acetate, cellulose butyrate, (met)acrylic resins, polystyrene, polycarbonate, linear polyamides and polyesters (such as polyethylene terephthalate and polybutylene terephthalate), polyurethanes and thermosetting polymers derived from poly(allyl carbonates) of polyols.

The stabilizing mixture according to the present invention can be used for any compound having a certain photochromatic activity.

Organic photochromatic compounds which can be used as component (b) of the mixture, may belong to the group of spirooxazines or spiropyranes. Organic photochromatic compounds belonging to the group of spirooxazines are those which can be defined with the following general formula:

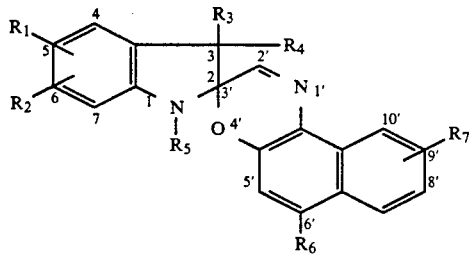
[A]

where: $R_1$ and $R_2$ independently represent a hydrogen or halogen atom (fluorine, chlorine or bromine) or a group chosen from:linear or branched $C_1$-$C_5$ alkyl or halogen-alkyl, alkoxy $C_1$-$C_5$, nitro or cyano; carboxyl, carboxy alkyl, carbonyl: $R_3$ and $R_4$ independently represent a linear or branched $C_1$-$C_5$ alkyl group, phenyl or benzyl; or $R_3$ and $R_4$ jointly considered at the carbon atom to which they are linked, form a cycloalkyl $C_5$-$C_8$ group; $R_5$ represents a linear or branched $C_1$-$C_5$ alkyl group, alkyl phenyl, benzyl or allyl alkoxy; $R_6$ represents the hydrogen atom or a linear or branched $C_1$-$C_5$ alkyl group, or the group —$NR_8R_9$ where $R_8$ is a linear or branched $C_1$-$C_5$ alkyl group, phenyl or benzyl, $R_9$ is hydrogen or has the same meaning as $R_8$, or $R_8$ and $R_9$, considered jointly at the nitrogen atom to which they are linked, form a cyclic structure with from 5 to 12 members, possibly containing an additional heteroatom chosen from oxygen and nitrogen; $R_7$ represents a hydrogen or halogen atom (fluorine, chlorine or bromine), or a group chosen from linear or branched $C_1$-$C_5$ alkyl, cyano thioalkyl, ester carboxylate with 1 to 3 carbon atoms in the ester portion, or it represents an aromatic or condensed heterocyclic nucleus; in one of the positions 7', 8', 9' or 10' with the CH group which can be substituted by N.

In particular, groups $R_1$ and $R_2$, when they are not hydrogen, can be connected to any of the positions 4, 5, 6 and 7 of the indolinic part of the molecule. Moreover, group $R_7$, when it does not represent hydrogen or an aromatic or condensed heterocyclic nucleus, can be present in any of the positions 7', 8', 9' and 10' of the naphthenic part of the molecule.

It is preferable to use photochromatic compounds corresponding to the general formula (A) in which: $R_1$ and $R_2$ independently represent the hydrogen atom or methyl group; $R_3$ and $R_4$ both represent the methyl group or jointly represent the cyclohexyl group; $R_5$ represents the methyl group; $R_6$ represents the hydrogen atom or —$NR_8R_9$ group and groups $R_8$ and $R_9$, together with the nitrogen atom to which they are connected, form a structure having a piperidine, morpholine, pyrrolidinile or hexamethylenimine nucleus; $R_7$ represents the hydrogen atom or methoxy group.

Examples of preferred photochromatic compounds belonging to the group of spirooxazines, used according to the present invention are: 1,3,3,4,5 or 1,3,3,5,6-pentamethyl spiro(indoline-2,3'-(3H)-naphtho-(2,1-b)-(1,4)-oxazine; 1,3,3-trimethylspiro(indoline-2,3'-(3H) naphtho-(2,1-b)-(1,4)-oxazine; 1,3,3-trimethyl spiro(indoline-6'-(1-piperidine)-2,3- (3H)naphtho-(2,1-b)-(1,4)-oxazine, 1,3,3-trimethyl spiro (indoline-6'-(1-morpholine)-2,3'-(3H)-naphtho-(2,1-b)-(1,4)-oxazine); 1,3,3,4,5- or 1,3,3,5,6-pentamethyl spiro (indoline-6'-(1-piperidine)-2,3'-(3H)-naphtho -(2,1-b)-(1,4)-oxazine); and 1,3,3-trimethyl spiro (indoline-6'-(1-piperidine)-9'-(methoxy)-2,3' (3H) naphtho(2,1-b) (1,4-oxazine).

Organic photochromatic compounds belonging to the group of spiropyranes are those represented by the following formulae:

Indoline spirobenzopyranes [B]
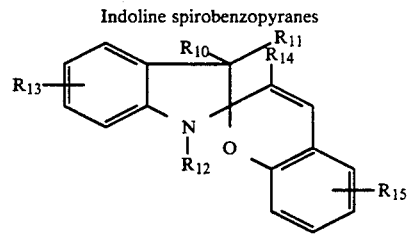

indoline spiro naphtho pyranes [C]
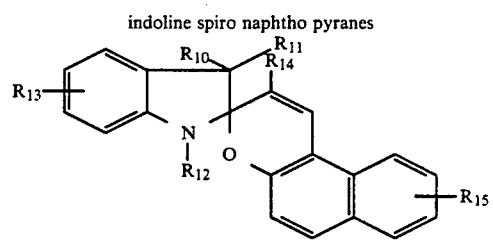

benzothiazoline spirobenzopyranes [D]
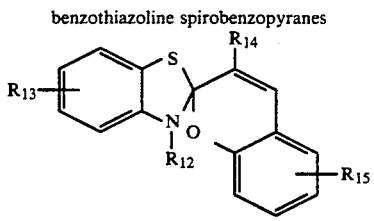

benzoxazoline spirobenzopyranes [E]
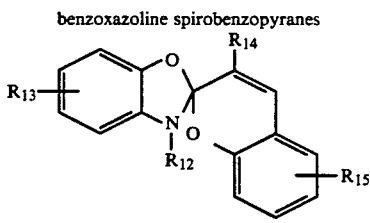

In the previous formulae: $R_{10}$ and $R_{11}$ represent alkylic or arylic groups; $R_{12}$ represents an alkylic, arylic, benzylic arylic or substituted alkylic (such as hydroxylakylic, halogenolakylic, carbalkoxyalkylic, alkoxyalkylic, aminoalkylic) group; $R_{14}$ represents hydrogen or an alkylic, arylic or alkoxylic group; $R_{13}$ and $R_{15}$ represent hydrogen or mono- or polysubstitution groups, chosen from alkylic and substituted alkylic groups, or halogen, nitro or alkoxy, cyano, carboxylic, carboxyalkylic, carbonylic.

It is also possible to use photochromatic compounds belonging to the group of spiro-indolino-oxazines described in Italian patent application No. 22660 A/89 filed on 12.12.1989 by the same Applicant and defined with the general formula (I):

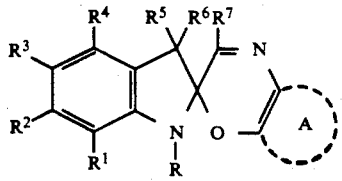   (I)

where:

R represents a hydrogen atom; a $C_1$–$C_5$ alkyl group, linear or branched; a similar $C_1$–$C_5$ alkyl group substituted with from 1 to 5 halogen atoms chosen from fluorine, chlorine, bromine or iodine, hydroxy groups, $C_1$–$C_5$ alkoxy groups, $C_1$–$C_5$ carboxy alkyl groups, cyano groups; a $C_2$–$C_5$ alkenyl group; a phenyl group; or benzyl group;

from $R_1$ to $R_4$, either the same or different, each stand independently for a hydrogen atom; a $C_1$–$C_5$ alkyl group, linear or branched; a similar $C_1$–$C_5$ alkyl group substituted with from 1 to 5 atoms of halogen chosen from fluorine, chlorine, bromine and iodine, hydroxy groups, $C_1$–$C_5$ alkoxy groups, $C_1$–$C_5$ carboxy alkyl groups, cyano groups; a $C_2$–$C_5$ alkenyl group; a benzyl group; a halogen atom chosen from fluorine, chlorine, bromine and iodine; a hydroxy group; a $C_1$–$C_5$ alkoxy group; an amino group; a monoalkyl ($C_1$–$C_5$) amino group; a di-alkyl ($C_1$–$C_5$) amino group; a cyclo-alkyl ($C_3$–$C_{10}$) amino group; a piperidine, piperazine or morpholine group; a carboxyl group; a carboxy alkyl ($C_1$–$C_5$) group; a carboxy alkenyl $C_1$–$C_5$ group; a carboxy amidic group; a substituted carboxy amidic N-alkyl ($C_1$–$C_5$) group, a substituted carboxy amidic N,N-dialkyl ($C_1$–$C_5$) group; a cyano group; a nitro group; a sulfonic group; a ($C_1$–$C_5$) alkyl sulfonic group; an aryl sulfonic group chosen from benzen sulfonic, p-toluen sulfonic, p-chlorotoluen sulfonic groups; an aryl group chosen from phenyl, biphenyl, naphthyl groups;

$R_5$ and $R_6$, either the same or different, each represent independently an alkyl group ($C_1$–$C_5$), linear or branched; a phenyl group; or $R_5$ and $R_6$, together with the carbon atom to which they are connected, jointly represent a cycloalkyl ($C_4$–$C_7$) group;

$R_7$ represents a hydrogen atom; a linear or branched alkyl ($C_1$–$C_5$) group; a phenyl group; a halogen atom chosen from fluorine, chlorine or bromine; an alkoxy ($C_1$–$C_5$) group; or a phenoxy group;

A represents an arenic, monocyclic or polycyclic group, containing at least one carbonylic function (C—O) on the nucleus or in the side chain, chosen from those which can be defined with formulae (II), (III), (IV), (V) or (VI) shown below:

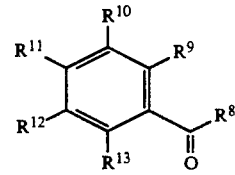   (II)

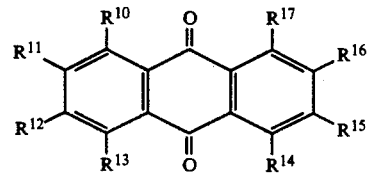   (III)

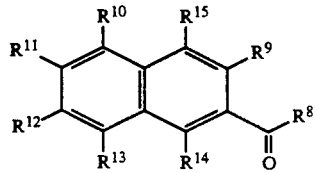   (IV)

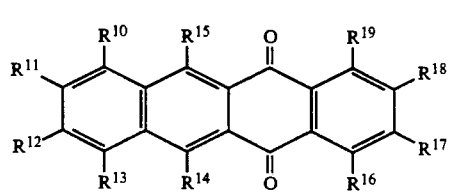   (V)

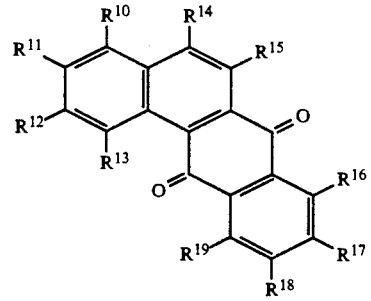   (VI)

where:

$R_8$ represents a hydrogen atom; a halogen atom chosen from chlorine and bromine; a linear or branched alkyl ($C_1$–$C_5$) group; an alkenyl ($C_2$–$C_5$) group; a monocyclic or polycyclic aryl group, or a heteroaryl group chosen from phenyl, naphthyl, anthracyl, furanyl, pyrrolyl, thiophenyl, quinolyl and pyrrolyl; or a similar aryl or heteroaryl group substituted with from 1 to 4 groups chosen from halogen atoms (fluorine, chlorine and bromine), linear or branched alkyl ($C_1$–$C_5$) groups, hydroxy groups, alkoxy $C_1$–$C_5$ groups, nitro groups, cyano groups, amino, monoalkyl ($C_1$–$C_5$) amino groups, di-alkyl($C_1$–$C_5$) amino groups, piperidine groups, piperazine groups or morpholine groups;

two contiguous points from $R_{10}$ to $R_{13}$ represent the condensation position with the oxazinic nucleus in the general formula (I) and the others have the same meaning as $R_1$–$R_4$;

$R_9$ and from $R_{14}$ to $R_{19}$ have the same meaning as $R_1$–$R_4$. Preferably, in formula (I):

R represents a methyl, ethyl, benzyl, 2-allyl, 2-hydroxyethyl or 2-carboxymethylethyl group;

from $R_1$ and $R_4$, either the same or different, each represent independently the hydrogen atom, a fluorine, chlorine or bromine atom, or a methyl, isopropyl, trifluoromethyl, hydroxymethyl, benzyl, hydroxy, methoxy, amino, piperidino, morpholino, carboxyl, carboxymethyl, N,N-dimethylcarboxyamide, cyano, nitro or phenyl group;

$R_5$ and $R_6$, either the same or different, each represent independently a methyl or phenyl group, or together with the carbon atom to which they are connected, jointly represent the cyclohexyl group;

$R_7$ represents the hydrogen atom, the chlorine atom or a phenyl, methyl or methoxy group;

A is one of the groups with formula from (II) to (VI) where:

$R_8$ represents the hydrogen atom, or a methyl, isopropyl, phenyl, p-N,N-dimethyl amino phenyl, p-cyano phenyl, p-nitro phenyl, p-methoxy phenyl, naphthyl, 2-thiophenyl, 2-furanyl or 4-pyridyl group;

two contiguous points from $R_{10}$ to $R_{13}$ represent the condensation position with the oxazinic nucleus in general formula (I) and the others each represent independently the hydrogen atom, a fluorine, chlorine or bromine atom, or a methyl, isopropyl, trifluoromethyl, hydroxymethyl, benzyl, hydroxy, methoxy, amino, piperidino, morpholino, carboxyl, carboxymethyl, N,N-dimethylcarboxyamido, cyano, nitro or phenyl group;

$R_9$ from $R_{14}$ to $R_{19}$ each represent independently the hydrogen atom, a fluorine, chlorine or bromine atom or a methyl, isopropyl, trifluoromethyl, hydroxymethyl, benzyl, hydroxy, methoxy, amino, piperidino, morpholino, carboxyl, carboxymethyl, N,N-dimethylcarboxytamido, cyano, nitro or phenyl group. Specific examples of preferred photochromatic compounds according to the present invention are:

1,3,3-trimethyl-8'oxyphenyl-spiro-indolino-2,3'-(3H) naphtho (2,1-b)-1,4-oxazine (IA);

1,1,1-trimethyl-spiro-indolino-2,3'-(3H)benzo(a-)anthracen7', 12 dione (3,4-b)1,4-oxazine (IB); and 1,3,3-trimethyl-8'oxyphenyl-6'-piperidinyl-spiro-indolino2,3'-(3H)naphto-(2,1-b) -1,4-oxazine (IC).

It is also possible to use photochromatic compounds belonging to the group of spiro-oxazepin-oxazines described in Italian patent application No. 22.659 a/89 filed on Dec. 12, 1989 by the same Applicant, definable with the general formula:

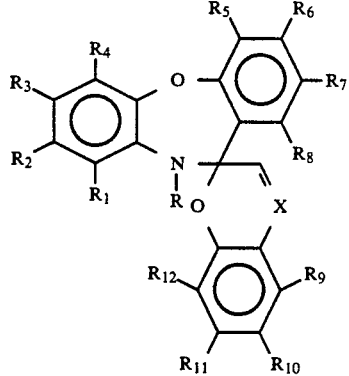

(VII)

where: X represents the nitrogen atom or CH group; R represents a hydrogen atom; a linear or branched alkyl $C_1$-$C_5$ group; a similar alkyl $C_1$-$C_5$ group substituted with from 1 to 5 halogen atoms chosen from fluorine, chlorine, bromine and iodine; an alkoxy $C_1$-$C_5$ group; a carboxyalkyl $C_1$-$C_5$ group; a cyano group; an alkenyl $C_2$-$C_5$ group; a phenyl group; or a benzyl from $R_1$ to $R_{12}$, either the same or different, each represent independently a hydrogen atom; a linear or branched alkyl $C_1$-$C_5$ group; an alkenyl $C_2$-$C_5$ group; a benzyl group; a halogen atom chosen from fluorine, chlorine, bromine and iodine; a hydroxy group; an alkoxy $C_2$-$C_5$ group; an amino group; a mono-alkyl ($C_1$-$C_5$) amino group; a di-alkyl ($C_2$-$C_5$) amino group; a cyclo-alkyl ($C_3$-$C_7$) amino group; a carboxyl group; a carboxyalkyl $C_1$-$C_5$ group; a carboxyamidic group; a substituted carboxyamidic N-alkyl ($C_1$-$C_5$), or substituted N,N-dialkyl ($C_1$-$C_5$) group; a cyano group or a nitro group; or two contiguous points between $R_9$, $R_{10}$, $R_{11}$ and $R_{12}$ jointly represent a condensed benzenic nucleus without any substituents or carrying from 1 to 3 substituents chosen from those described for $R_1$-$R_{12}$.

Preferably, in formula (VII), R represents the hydrogen atom or the methyl radical; from $R_1$ to $R_8$ each represent independently the hydrogen atom or the methyl radical, from $R_9$ to $R_{12}$ each represent independently the hydrogen atom, the methoxy radical or the nitro radical; or two adjacent points jointly represent a condensed benzenic nucleus without any substituents or carrying from 1 to 3 substituents chosen from the methoxy, nitro and carboxymethyl groups.

Specific examples of preferred photochromatic compounds according to the present invention are:

10-methyl spiro dibenzo (b,f)-1,4-oxazepin-11,3'-(11h)naphtho (2,1-b)-(1,4-oxazine).

10-methyl-8'-methoxy-6'nitro spiro dibenzo(b,-f)-1,4-oxazepin-11,2'-(11h)benzo(2,1-b) (3H) pyrano;

10-methyl-8'-methoxy spiro dibenzo (b,f)-1,4-oxazepin-11,3'-(11h)naphtho(2,1-b)-(1,4-oxazine); and methylic acid ester 10-methyl spiro dibenzo (b,f)-1,4-.

As already specified, the mixture of stabilizing additives contains a cyclic amine chosen from DABCO and quinuclidine, or their derivatives and at least one sterically hindered amine in the weight ratios already indicated.

One type of sterically hindered amine is that which can be defined with the formula:

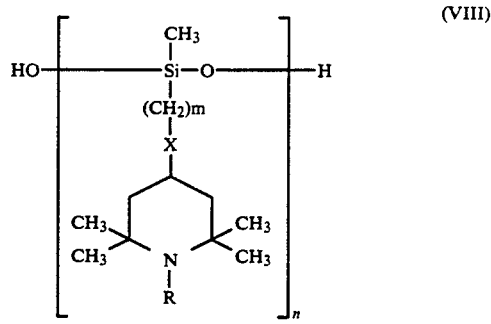

(VIII)

in which R is hydrogen or methyl, X is oxygen or nitrogen, m is a number ranging from 2 to 10 and n is a number ranging from 1 to 100.

Amines corresponding to the above formula (VII) are described in Italian patent application No. 21935 A/86 in the name of the same Applicant, of which all points of interest form an integral part of the present description.

The stabilizing effect described above can also be obtained by substituting the 1,4-diazabicyclo-(2.2.2) or its derivatives with other types of hindered amines; in this way, those corresponding to formula (IX) can also be used

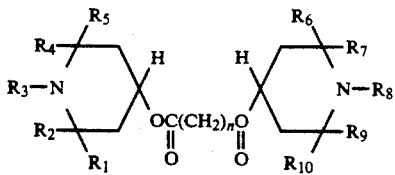

in which $R_1$, $R_1$, $R_4$, $R_5$, $R_6$, $R_7$ and $R_{10}$ are alkyls with a low number of carbon atoms; $R_3$ and $R_8$ are as specified above or hydrogen; n ranges from 1 to 12 or alternatively, amines corresponding to formula (X) may be used

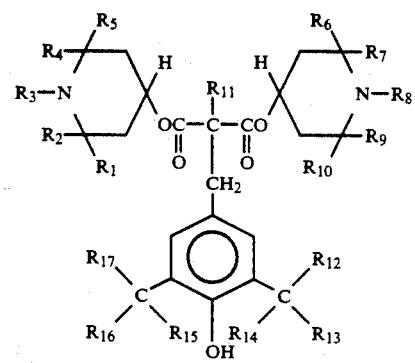

in which $R_1$, $R_2$, $R_4$, $R_5$, $R_6$, $R_7$, $R_9$, $R_{10}$, $R_{11}$, $R_{12}$, $R_{13}$, $R_{14}$, $R_{15}$, $R_{16}$ and $R_{17}$ are alkyls with a low number of carbon atoms; $R_3$ and $R_8$ are as specified above or hydrogen. Other amines correspond to formula XI

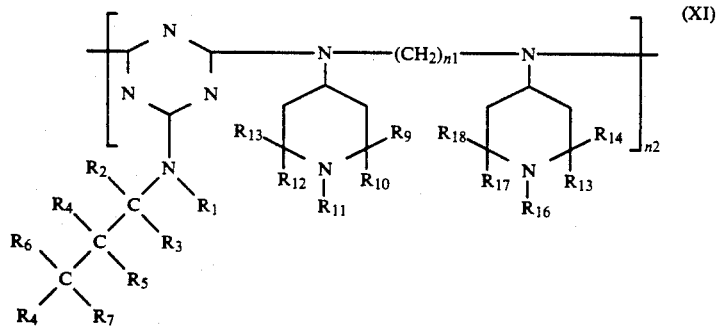

in which $R_1$, $R_4$, $R_5$, $R_{11}$ and $R_{16}$ are alkyls with a low number of carbon atoms or hydrogen; $R_2$, $R_3$, $R_6$, $R_7$, $R_8$, $R_9$, $R_{10}$, $R_{12}$, $R_{13}$, $R_{14}$, $R_{15}$, $R_{17}$ and $R_{18}$ are alkyls with a low number of carbon atoms; $n_1$ is between 1 and 12 and $n_2$ between 1 and 15. Amines corresponding to formula XII can also be used

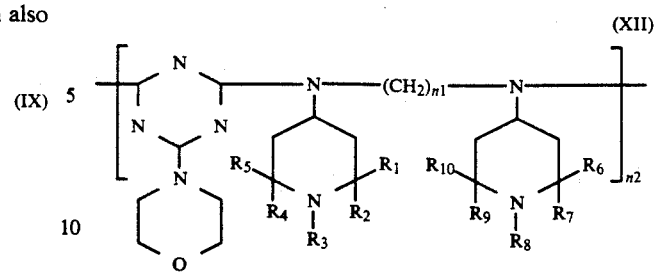

in which $R_1$, $R_2$, $R_4$, $R_5$, $R_6$, $R_7$, $R_9$ and $R_{10}$ are alkyls with a low number of carbon atoms; $R_3$ or $R_8$ are as specified above or are hydrogen; $n_1$ is between 1 and 12 and $n_2$ between 1 and 15. Finally, amines corresponding to formula XIII can be used

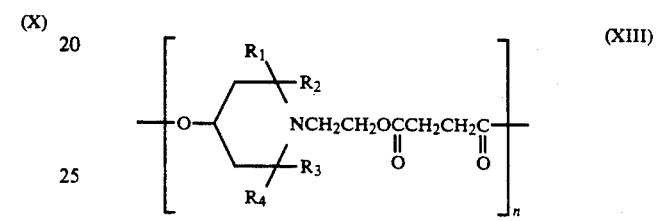

in which $R_1$, $R_2$, $R_3$ and $R_4$ are alkyls with a low number of carbon atoms and n is between 1 and 15.

Among the amines having formula VIII, it is particularly advantageous to use that in which m is 3 and R represents hydrogen.

Among those having formula IX, the following examples may be used: bis(2,2,6,6-tetramethyl-4-piperidinyl) sebacate, also known as Tinuvin 770 or bis(1,2,2,6,6,-pentamethyl-4-piperidinyl) sebacate, also known as Tinuvin 765, both are commercial products of Ciba-Geigy.

Among the products of formula (X), di(1,2,2,6,6-pentamethyl-4-piperidinyl) butyl (3',5'-diterbutyl-4-hydroxybenzyl) malonate, better known under the trade-name Tinuvin 144, is of particular interest.

As far as the compounds of formula (XI) are concerned, reference should definitely be made to the product known as Chimossarb 924, which is a poly [(6-(1,1,3,3-tetramethylbutyl)amine]-1,3-5-triazine-2,4-diyl) (6-[2,2,6,6-tetramethyl-4-piperidinyl]amino-hexamethylene], also produced by Ciba-Geigy.

With respect to the structures corresponding to formulae (XI) and (XIII), examples consist of poly[6-(morpholine)-s-triazine-2,4-diyl] [1, 6-(2,2, 6,-6-tetra-methyl-4-piperidyl)amino]hexamethylene, known as Cyasorb 3346 of American Cynamid, and of the commercial product Tinuvin 622 (Ciba) which is dimethylsuccinic ester of 4-hydroxy-2,2,6,6-tetramethyl-1-piperidinethanol.

The use of compounds corresponding to formulae (VIII) and (XIII) as stabilizers for photochromatic materials is already described in the above-mentioned US patent No. 4.720.356 which should be referred to for any further information concerning these compounds.

Returning to the fields of application, the photochromatic composition of the present invention can be suitably used for paints, inks, adhesives, fibres, fabrics etc.

More specifically, the photochromatic articles made of plastic, containing the photochromatic composition according to the present invention (mixture a, b and c mentioned previously), are obtained by the heat processing of the mixture of relevant components; this mixture can be prepared using normal techniques such as dry mixing, with or without a wetting agent, or by mixing with a volatile solvent and homogenizing with techniques such as Banbury, calender and others.

These mixtures may additionally contain other components, common in the field of thermoplastics, such as inert fillers, plasticizers, pigments, lubricants, antistatic agents, sliding agents, antiblocking agents and others.

The mixtures of components a), b) and c), containing at times one or more additives among those already mentioned, are transformed into finished products by means of heat processing.

For this purpose, melt processing techniques may be used, such as extrusion, spinning, compression moulding, injection moulding, blow moulding, calendering, or reaction injection moulding (RIM), and other techniques which are normally carried out within a temperature range of approx. 100° C. to approx. 300° C.

In this way, products are obtained such as films, fibres, bands, slabs, moulded items, containers, protective filters, technical articles, transparent sheets of glass, optical instruments, toys, fabrics which show no signs of degradation of the photochromatic compound and which are capable of maintaining their photochromatic characteristics for extremely long periods of time.

The experimental examples which follow are intended to provide a clearer illustration of the present invention but do not limit it in any way. In these examples use is made of the following photochromatic substances (component b):

A) 1,3,3-trimethyl spiro (indoline-6'-(1-piperidine)-2,3'- (3H) -naphtho-(2,1-b)-(1,4) oxazine)

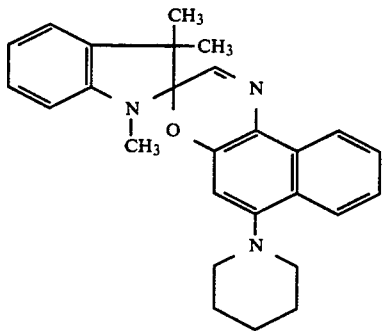

B) 1,3,3-trimethyl spiro (indolino-2,3'-(3H)naphtho-(2,1-b)-(1,4) -oxazine)

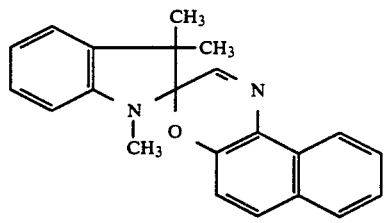

C) 1,3,3,4,5-and 1,3,3,5,6-pentamethyl spiro (indolino-2,3'- (3H) -naphtho-(2,1-b)(1,4)-oxazine)

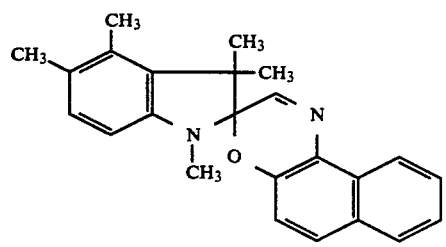

and the following sterically hindered amines (second component of the stabilizing mixture c)

HALS 1)

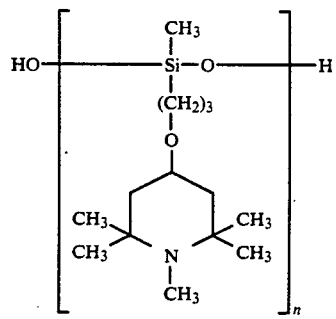

(average value of n approx. 8)

HALS 2) TINUVIN 770 (commercial product of Ciba-Geigy). These components are added to polypropylene and acrylic paint to obtain strips, films and photochromatic prints. The strips and films are obtained by injection moulding or extrusion whereas the paints are applied by screen printing on strips of white cotton and dried in an oven at 110° C. for 10 minutes. The following characteristics of the photochromatic products thus obtained are established:

UV-visible spectrum, determined with a Cary 2300 spectrophotometer, in absorbance on transparent or translucent materials such as film and polypropylene strips.

The optical density measured at the wave-length of maximum absorption of the compound in its disactivated form, is considered as a measurement of the concentration of the photochromatic compound in the sample.

Photochromatic activity estimated by determining the light reflectance variation ($\Delta R$) at 23° C., carried out with a Gardner HAZEMETER XL 211 after activation for 15 seconds with a UVA lamp having an irradiance of 9 $W/m^2$. (For transparent materials this measurement is carried out by putting the test samples on white, reflecting cardboard).

Accelerated aging resistance, intended as the duration of the photochromatic activity over a period of time, determined with a Weather o Meter (WOM) Atlas equipped with a 6500 W Xenon lamp with continuous irradiation, operating at a temperature of 63° C. on a black reference panel and with a relative humidity of 50%. The aging resistance is calculated by measuring over different periods of exposure in WOM, the optical density values at λ max of the disactivated form when possible and the residual ΔR after activation with a UVA lamp.

EXAMPLE 1

6 mixtures are prepared (no.1-6 in Table 1), composed of Moplen FLF 20 polypropylene of HIMONT, having a fluidity degree of 11, of photochromatic product A, of HALS 1 and 1,4-diazabicyclo(2,2,2)octane (DABCO).

TABLE 1

| Mixture No. | 1 | 2 | 3 | 4 | 5 | 6 |
|---|---|---|---|---|---|---|
| FLF 20 | 100% | 100% | 100% | 100% | 100% | 100% |
| Photo-chromatic A | 0.1% | 0.1% | 0.1% | 0.1% | 0.1% | 0.1% |
| Component 1 | 0.25% | — | — | 0.25% | 0.25% | 0.25% |
| DABCO | — | 0.25% | 2% | 0.25% | 0.5% | 2% |

Tests 1, 2 and 3 are to be considered comparative tests as only the sterically hindered amine is present in test sample No.1, whereas samples 2 and 3 only contain DABCO in two different ratios.

The mixtures thus prepared are transformed into 1 mm thick strips, by means of injection moulding at a temperature of 220° C. The Optical Density (referred to the non-activated form) and photochromatic activity (expressed as ΔR) related to the aging time in WOM, are shown in Table 2.

TABLE 2

| Aging hours (WOM) | | Composition | | | | | |
|---|---|---|---|---|---|---|---|
| | | 1 | 2 | 3 | 4 | 5 | 6 |
| 0 | (1) | 2.479 | 2.092 | 2.968 | 1.854 | 2.262 | 2.965 |
| | ΔR | 54.3 | 55.0 | 54.5 | 55.8 | 53.5 | 53.2 |
| 100 | (1) | 0.821 | 1.206 | 2.205 | 1.413 | 1.762 | 2.312 |
| | ΔR | 39.1 | 47.3 | 51.5 | 49.5 | 51.8 | 52.7 |
| 200 | (1) | 0.000 | 0.562 | 1.456 | 0.936 | 1.285 | 1.746 |
| | ΔR | 1.5 | 29.0 | 42.1 | 38.7 | 42.2 | 43.8 |
| 300 | (1) | — | 0.000 | 0.753 | 0.534 | 0.818 | 1.320 |
| | ΔR | — | 2.5 | 28.7 | 20.0 | 31.8 | 37.5 |
| 400 | (1) | — | — | 0.168 | 0.323 | 0.431 | 0.84 |
| | ΔR | — | — | 5.8 | 7.0 | 19.3 | 33.2 |

Note: (1) = Optical density deactivated form (360 nm)

The data given in Table 2 effectively show the stabilizing effect of the sterically hindered amine-DABCO mixture, according to the present invention. In particular, if we make a comparison between tests 1, 2 and 4 as well as between samples 1, 3 and 6, we can see that samples 4 and 6, respectively, give better results with respect to aging resistance. Moreover, if we compare test samples 4, 5 and 6 in which the quantity of sterically hindered amine is kept constant whereas the % of DABCO increases, we can note that on increasing the DABCO, a further improvement in the stability is obtained.

EXAMPLE 2

Mixtures 7 to 10 (Table 3) are prepared, composed of acrylic paint with an addition of carboxymethyl cellulose (TEXILAC 167200 —a commercial product of MONOUKIAN), of photochromatic product B, of HALS 2 and DABCO. Test samples 7, 8 and 9 without the stabilizing mixture of the present invention, are used as comparisons.

TABLE 3

| Mixture No. | 7 | 8 | 9 | 10 |
|---|---|---|---|---|
| TEXILAC | 100% | 100% | 100% | 100% |
| Photochromatic B | 1% | 1% | 1% | 1% |
| Hals 2 | — | 1% | — | 1% |
| DABCO | — | — | 1% | 1% |
| Toluene | 10-15 | 10-15 | 10-15 | 10-15 |

The paints thus obtained are screen printed on white cotton strips and then dried in an oven at 110° C. for 10 minutes. Table 4 shows the stability results obtained for these paints. In this case aging was determined by characterizing the photochromatic activity by means of reflectancy variation measurements (ΔR).

TABLE 4

| Composition | 7 | 8 | 9 | 10 |
|---|---|---|---|---|
| ΔR no aging | 28.9 | 27.1 | 27.8 | 28.3 |
| ΔR 20 h WOM | 16.5 | 19.1 | 23.4 | 25.4 |
| ΔR 40 h WOM | 3.8 | 9.0 | 11.8 | 16.2 |
| ΔR 60 h WOM | 0.0 | 2.2 | 0.5 | 8.8 |

From Table 4 it can be clearly seen that in test sample 10 the stabilizing effect is much higher than it is in the comparative samples (7, 8 and 9).

EXAMPLE 3

Using the same procedure as in Example 2, mixtures 11 to 14 (Table 5) were prepared using photochromatic product C, HALS 2 and DABCO. Test samples 11, 12 and 13 are used as comparisons.

TABLE 5

| Mixture No. | 11 | 12 | 13 | 14 |
|---|---|---|---|---|
| TEXILAC | 100% | 100% | 100% | 100% |
| Photochromatic C | 1% | 1% | 1% | 1% |
| Hals 2 | — | 1% | — | 1% |
| DABCO | — | — | 1% | 1% |
| Toluene | 10-15 | 10-15 | 10-15 | 10-15 |

These mixtures are transformed into prints by screen printing and are evaluated in the same way as Example 2. The results obtained, shown in Table 6, prove that test 14 which contains the stabilizing mixture of the present invention, has the best aging resistance.

TABLE 6

| Composition | 11 | 12 | 13 | 14 |
|---|---|---|---|---|
| ΔR no aging | 39.1 | 40.0 | 40.5 | 40.4 |
| ΔR 20 h WOM | 30.0 | 32.2 | 34.8 | 36.8 |
| ΔR 40 h WOM | 12.1 | 20.0 | 18.2 | 28.2 |

We claim:

1. Photochromatic composition having a long-lasting activity containing at least one photochromatic compound and a stabilizing effective amount of a stabilizing mixture comprising compounds having photochromatic activity comprising a cyclic amine selected from 1,4-diaza bicyclo-(2.2.2) octane (DABCO) or quinuclidine, and at least one sterically hindered amine (HALS).

2. Photochromatic composition having a long-lasting activity according to claim 1 in which the weight ratio between the stabilizing mixture and the photochromatic compound ranges from 0.5 to 50.

3. Photochromatic composition having a long-lasting activity according to claim 1 in which the weight ratio between the stabilizing mixture and the photochromatic compound ranges from 2 to 25.

4. Photochromatic composition having a long-lasting activity according to any one of claims 1-3, wherein the cyclic amine is DABCO.

5. Photochromatic composition having a long-lasting activity according to any one of claims 1-3, wherein the cyclic amine is quinuclidine.

6. Photochromatic composition having a long-lasting activity according to any one of claims 1-3 in which the photochromatic compound is chosen from those corresponding to one of the following formulae (A), (B), (C):

Spiroxazines (A)

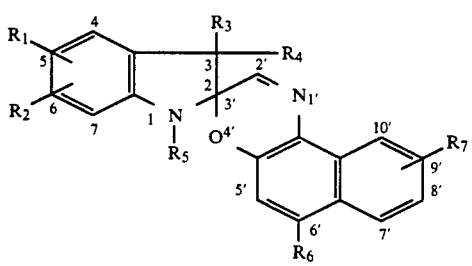

where:
- $R_1$ and $R_2$ independently represent a hydrogen or halogen atom or a group selected from: linear or branched $C_1-C_5$ alkyl or halogen-alkyl, alkoxy $C_1-C_5$, nitro, cyano, carboxyl, carboxy alkyl, carbonyl or
- $R_3$ and $R_4$ independently represent a linear or branched $C_1-C_5$ alkyl group, phenyl or benzyl; or $R_3$ and $R_4$ jointly considered at the carbon atom to which they are linked, form a cycloalkyl $C_5-C_8$ group;
- $R_5$ represents a linear or branched $C_1-C_5$ alkyl group, alkyl phenyl, benzyl or allyl alkoxy;
- $R_6$ represents hydrogen or a linear or branched $C_1-C_5$ alkyl group, or the group $-NR_8R_9$ where $R_8$ is a linear or branched $C_1-C_5$ alkyl group, phenyl or benzyl, $R_9$ is hydrogen or has the same meaning as $R_8$, or $R_8$ and $R_9$, considered jointly at the nitrogen atom to which they are linked, form a cyclic structure with from 5 to 12 members, optionally containing an additional heteroatom chosen from oxygen and nitrogen;
- $R_7$ represents a hydrogen or halogen atom, or a group selected from linear or branched $C_1-C_5$ alkyl, cyano, thioalkyl, ester carboxylate with 1 to 3 carbon atoms in the ester portion, or it represents an aromatic or condensed heterocyclic nucleus;
- in one of the positions 7',8',9' or 10', the CH group can be substituted by N;

Indoline spirobenzopyranes (B)

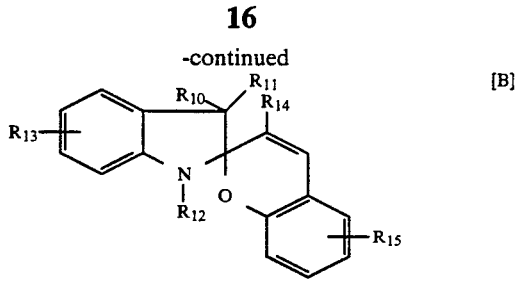

indoline spiro naphtho pyranes (C)

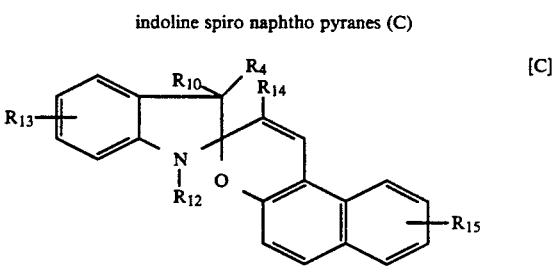

wherein
- $R_{10}$ and $R_{11}$ represent alkyl or aryl groups;
- $R_{12}$ represents an alkyl, aryl, benzyl aryl or halogenolakyl, carboalkoxyalkyl, alkoxyalkyl or aminoalkyl group;
- $R_{14}$ represents hydrogen or an alkyl, aryl or alkoxyl group;
- $R_{13}$ and $R_{15}$ represent hydrogen or mono- or poly-substitution groups, selected from alkyl, halogen, nitro, alkoxy, cyano, carboxyl, carboxyalkyl or carbonyl groups.

7. Photochromatic composition having a long-lasting activity according to any one of claims 1-3, in which the photochromatic compound is chosen from those corresponding to one of the following formulae (I) or (VII):

$$\text{(I)}$$

where:
- R represents a hydrogen atom; a $C_1-C_5$ alkyl group, linear or branched; $C_1-C_5$ alkyl group substituted with from 1 to 5 halogen atoms selected from fluorine, chlorine, bromine or iodine, hydroxy groups, $C_1-C_5$ alkoxy groups, $C_1-C_5$ carboxy alkyl groups, cyano groups; a $C_2-C_5$ alkenyl group; a phenyl group; or a benzyl group;
- $R_1$, $R_2$, $R_3$ and $R_4$, either the same or different, each stand independently for a hydrogen atom; a $C_1-C_5$ alkyl group, linear or branched; $C_1-C_5$ alkyl group substituted with from 1 to 5 atoms of halogen selected from fluorine, chlorine, bromine and iodine, hydroxy groups, $C_1-C_5$ alkoxy groups, $C_1-C_5$ carboxy alkyl groups, cyano groups; a $C_2-C_5$ alkenyl group; a benzyl group; a halogen atom selected from fluorine, chlorine, bromine and iodine; a hydroxy group; a $C_1-C_5$ alkoxy group; an amino group; a mono alkyl ($C_1-C_5$) amino group; a dialkyl ($C_1-C_5$) amino group; a cyclo-alkyl ($C_3-C_{10}$)

amino group; a piperidine, piperazine or morpholine group; a carboxyl group; a carboxy alkyl ($C_1$–$C_5$) group; a carboxy alkenyl $C_1$–$C_5$ group; a carboxy amidic group; a carboxy amidic N-alkyl ($C_1$–$C_5$) group, a carboxy amidic N,N-dialkyl ($C_1$–$C_5$) group; a cyano group; a nitro group; a sulfonic group; a ($C_1$–$C_5$) alkyl sulfonic group; an aryl sulfonic group selected from benzene sulfonic, p-toluene sulfonic, p-chlorotoluene sulfonic groups; an aryl group selected from phenyl, biphenyl or naphthyl groups;

$R_5$ and $R_6$, either the same or different, each represent independently an alkyl group ($C_1$–$C_5$), linear or branched; a phenyl group; or $R_5$ and $R_6$, together with the carbon atom to which they are connected, jointly represent a cyloalkyl ($C_4$–$C_7$) group;

$R_7$ represents a hydrogen atom; a linear or branched alkyl ($C_1$–$C_5$) group; a phenyl group; a halogen atom selected from fluorine, chlorine or bromine; an alkoxy ($C_1$–$C_5$) group; or a phenoxy group;

A represents an arenic, monocyclic or polycyclic group, containing at least one carbonylic function (C—O) on the nucleus or in the side chain, selected from the following formulae (II), (III), (IV), (V) or (VI):

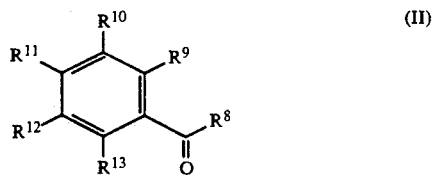
(II)

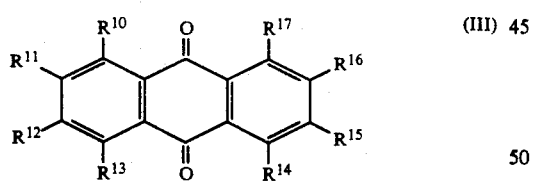
(III)

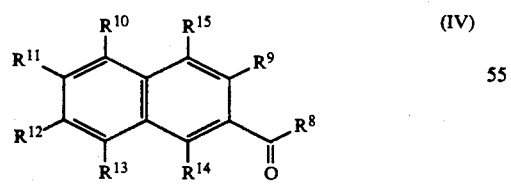
(IV)

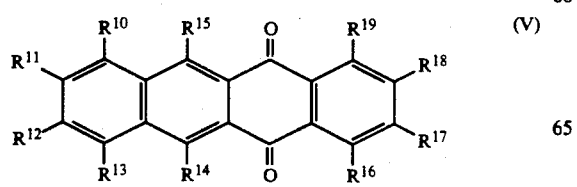
(V)

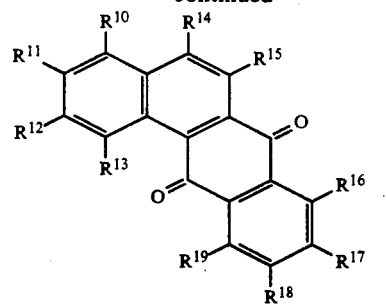
(VI)

where:

$R_8$ represents a hydrogen atom; a halogen atom selected from chlorine and bromine; a linear or branched alkyl ($C_1$–$C_5$) group; an alkenyl ($C_2$–$C_5$) group; a monocyclic or polycyclic aryl group, or a heteroaryl group selected from phenyl, naphthyl, anthracyl, furanyl, pyrrolyl, thiophenyl, quinolyl and pyrrolyl; or these aryl or heteroaryl groups substituted with from 1 to 4 groups selected from halogen atoms linear or branched alkyl ($C_1$–$C_5$) groups, hydroxy groups, alkoxy $C_1$–$C_5$ groups, nitro groups, cyano groups, amino, mono-alkyl ($C_1$–$C_5$) amino groups, di-alkyl ($C_1$–$C_5$) amino groups, piperidine groups, piperazine groups or morpholine groups;

two contiguous points from $R_{10}$ to $R_{13}$ represent the condensation position with the oxazinic nucleus in the general formula (I) and the others have the same meaning as defined above for $R_1$–$R_4$;

$R_9$ and from $R_{14}$ to $R_{19}$ have the same meaning as defined above for defined above for $R_1$–$R_4$;

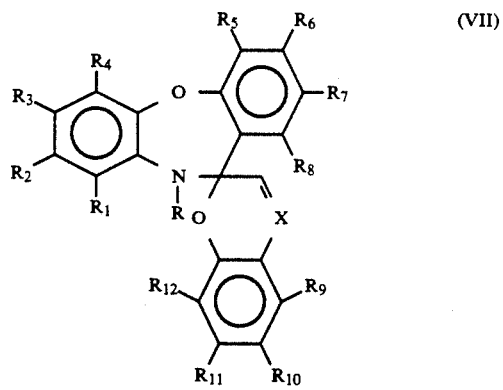
(VII)

where:

X represents the nitrogen atom or CH group;

R represents a hydrogen atom; a linear or branched alkyl $C_1$–$C_5$ group; an alkyl $C_1$–$C_5$ group substituted with from 1 to 5 halogen atoms selected from fluorine, chlorine, bromine and iodine; an alkoxy $C_1$–$C_5$ group; a carboxyalkyl $C_1$–$C_5$ group; a cyano group; an alkenyl $C_1$–$C_5$ group; a phenyl group; or a benzyl group;

$R_1$ to $R_{12}$, either the same or different, each represent independently a hydrogen atom; a linear or branched alkyl $C_1$–$C_5$ group; an alkenyl $C_2$–$C_5$ group; a benzyl group; a halogen atom;

a hydroxy group; an alkoxy $C_1$–$C_5$ group; an amino group; a mono-alkyl ($C_1$–$C_5$) amino group; a di-alkyl ($C_1$–$C_5$) amino group; a cyclo-alkyl ($C_3$–$C_7$) amino group; a carboxyl group; a carboxyalkyl $C_1$–$C_5$ group; a carboxyamidic group; a carboxyamidic N-alkyl ($C_1$–$C_5$), or N,N-dialkyl ($C_1$–$C_5$) group; a cyano group or a nitro group; or two contiguous points between $R_9$, $R_{10}$, $R_{11}$ and $R_{12}$ jointly represent a condensed benzenic nucleus without any substituents or carrying from 1 to 3 substituents selected from those defined above for $R_1$–$R_{12}$.

8. Photochromatic product including an organic polymer and a photochromatic composition according to any one of claims 1-3.

9. Photochromatic product according to claim 8 in which the photochromatic compound is present in an amount of from 0.01 to 3 parts by weight for every 100 parts of organic polymer.

10. Photochromatic article according to claim 8 in which the organic polymer is selected from the group consisting of polyethylene, polypropylene, poylvinylchloride, plasticized polyvinylchloride, ethylenevinylacetate copolymer, polyvinylacetate, cellulose acetate, cellulose butyrate, (meth)acrylic resins, polystyrene, polycarbonate, polyamides and linear polyesters.

11. Photochromatic article according to claim 9 in which the organic polymer is selected from the group consisting of polyethylene, polypropylene, polyvinylchloride, plasticized polyvinylchloride, ethylene-vinylacetate copolymer, polyvinylacetate, cellulose acetate, cellulose butyrate, (meth)acrylic resins, polystyrene, polycarbonate, polyamides and linear polyesters.

* * * * *